J. W. Sykes.
Hoisting Grain.
N° 95747.　　　Patented Oct. 12, 1869

Witnesses:　　　　　　　　　　　　　　　Inventor:
C. E. Wilson　　　　　　　　　　　　　　J. W. Sykes.
Edmund Masson　　　　　　　　By atty A. V. Stoughton.

J. W. Sykes.
Hoisting Grain.
Nº 95747. Patented Oct. 12, 1869.

Witnesses:
C. C. Wilson
Edmund Masson

Inventor:
J. W. Sykes
By A. B. Stoughton, Atty

UNITED STATES PATENT OFFICE.

JAMES W. SYKES, OF CHICAGO, ILLINOIS.

IMPROVEMENT IN RAILROAD GRAIN-TRANSFERRERS.

Specification forming part of Letters Patent No. 95,747, dated October 12, 1869.

*To all whom it may concern:*

Be it known that I, JAMES W. SYKES, of Chicago, in the county of Cook and State of Illinois, have invented certain new and useful Improvements in a Railroad Grain-Transferrer; and I do hereby declare the following to be a full, clear, and exact description of the same, reference being had to the accompanying drawings, making a part of this specification, in which—

Figure 1:
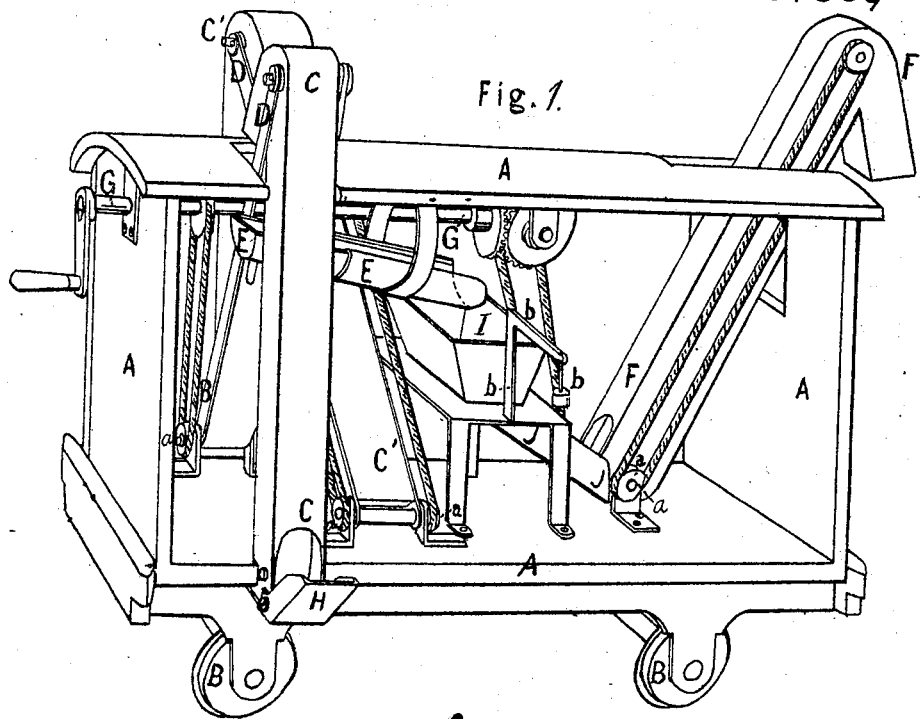
Figure 2:
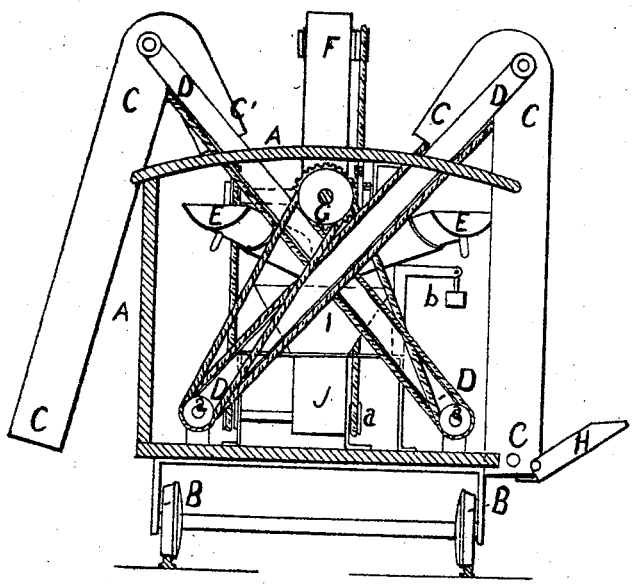
Figure 5:
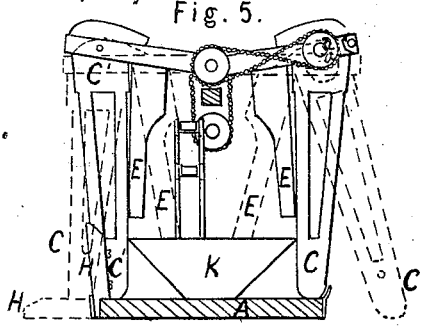
Figure 4:
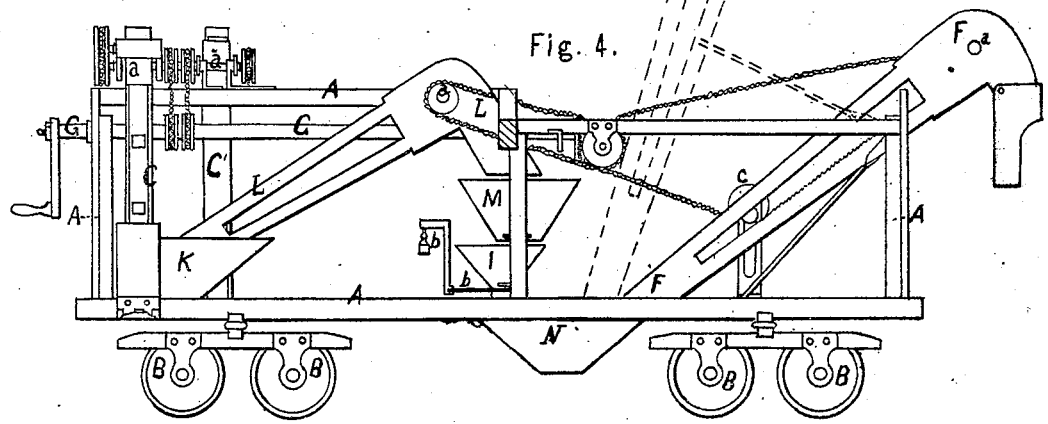
Figure 3:
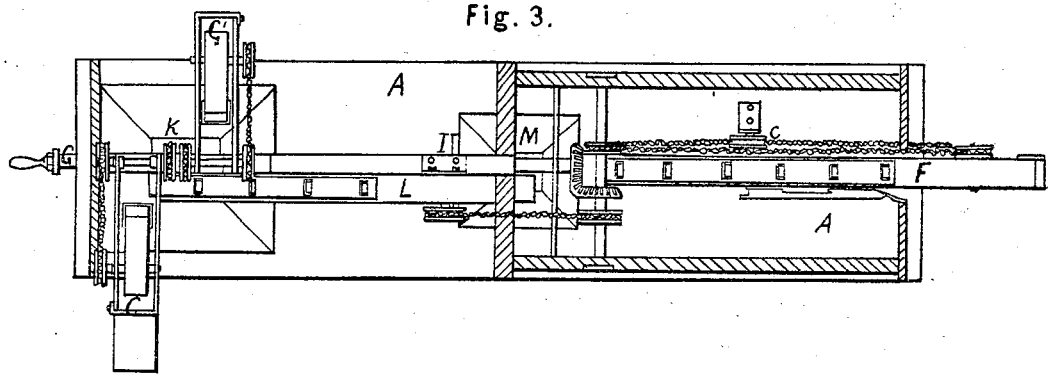

Figure 1 represents, in perspective, a transferring apparatus arranged in a car, or upon truck-wheels, so that it may be moved on a railroad-track to the place where grain is to be transferred from one place to another by it, or where it is to be used for such purpose. Fig. 2 represents a vertical cross-section, taken through the car-body, so as to show an end view of the apparatus arranged within it. Figs. 3, 4, and 5, represent, respectively, in side elevation, top plan, and end elevation, an arrangement of substantially the same devices, in a modified plan, but so as to accomplish the same result.

Similar letters of reference, where they occur in the several separate figures, denote like parts of the apparatus in all of the drawings.

My invention consists in arranging in or on a car or set of car-wheels or trucks a grain-elevating and transferring mechanism, driven by power and mechanism on and carried by said car; and, in connection with such elevating and transferring-apparatus, a weighing-apparatus, by which the grain may be weighed in its transit from one car to another, or from a car to a storehouse or other place of deposit, or vice versa, if so desired.

To enable others skilled in the art to make and use my invention, I will proceed to describe the same with reference to the drawings.

A represents a car mounted on truck-wheels, by means of which it can be moved on a railroad-track from place to place, as may be desired. At one end of this car and, for convenience, at each side of it are arranged two trunks or tubes, C C', and hinged by rods or bars D D, so that they may be swung into different positions or inclinations, in which trunks or tubes are placed carrying or elevating belts with buckets, (shown in Fig. 3,) by which grain may be taken at the base, and delivered at or near their top into spouts or troughs, E, whence it may be carried and delivered into a hopper, pit, or other receptacle, as will be hereafter explained. At the opposite end of the car from the tubes C C' is arranged another trunk or tube, F, also hinged so as to admit of different degrees of inclination, to adapt it to the place or position to which the grain is to be transferred, this latter trunk or tube being also furnished with carrying-belts and buckets for taking the grain at the bottom and delivering it at the top, or nearly so, of said tube. On the car is arranged a shaft, G, furnished with pulleys and gear, from which power is communicated, through endless bands or gears, to one of the shafts or drums $a\ a\ a$, over which the conveying-belts and their buckets pass. The power to drive the shaft G and the carrying-belts may be from an engine placed on the car, and worked by steam or other well-known power, and the power of this engine on the car may be used for moving the car on the track from place to place, by connecting it to the carrying-wheels B B, or their axles, by suitable connecting and disconnecting gears. The trunks C C' are hinged at their tops, while the one F is hinged at its lower end. And those C $C^5$ may have a shoe or receiver, H, at their lower ends, into which the grain to be transferred may be placed or allowed to run, so that it may thence readily enter into the tubes and be taken up by the conveyers therein. By this construction the grain carried up in the tubes of trunks C C' is dropped into the downwardly-bent ends of said trunks at their tops, and, falling into the troughs or spouts E, is carried by them and delivered into a hopper, box, or receiver, I, with which there is connected a weighing-apparatus, as at $b$, by which the grain may be weighed in transit through the transferring-apparatus.

Through an opening in the bottom of the receptacle I, controlled by a slide or other cut-off, the grain passes down a trough, spout, or chute, J, to the bottom of the trunk F, and entering therein, is taken by the conveyer within said trunk, carried up and delivered into the final place of delivery, or into a trough that will run it to its place of delivery, said trunk, as above explained, being capable of greater or less inclination, to adapt it to the delivery-point.

Hinging the receiving-trunks at their tops admits of swinging or moving their lower ends to the grain that is to be transferred, as, for instance, into a car on an adjacent track, where grain, as is now quite common, is carried in bulk, and where they may take in, or have shoveled into them, the grain to be transferred. The weighing of the grain in transitu is a great check upon the present wastage which follows the transferring by hand. Hinging the delivering-trunk at its bottom admits of moving the upper or delivery-end to such points as may more equally distribute the grain or locate it at the delivery-point.

Figs. 3, 4, and 5 show a modification of the general arrangement of receiving and distributing trunks or tubes, but in nowise changing the mode of operation. In this arrangement, the side receiving trunks or tubes deliver the grain in a box, hopper, or pit, K, on the floor of the car, from whence it is taken by the trunk L, and the conveyers within it, and delivered in a hopper or box, M, where it can be retained, and by means of a slide or cut-off in its bottom, allowed to run into a weighing-hopper, I, connected to which is a weighing-apparatus, $b$, of the kind commonly used in connection with weighing-hoppers. And from the weighing hopper, box, or pit I, the grain is run through a controllable opening into a hopper, box, or pit, N, on or under the floor of the car, from whence it is taken by the conveyer in the trunk F and delivered, as in the first-mentioned arrangement, into another car, warehouse, or other depository. The dotted lines show the trunks in the varied positions in which they may be moved.

In figs. 3 and 4 is shown a weighted pulley, $c$, for straining the driving-belt or chain, to prevent slipping on the pulleys.

In practice, the trunks or tubes C C' are placed into the car of grain whenever practicable. When, for any reason, this is impossible, the foot of the trunk C or C' is placed in the receiver or hopper H, which is placed in a leaning position against the full car of grain, and which hopper may be of wood, iron, or canvas. Into it the grain is run, and from thence it is elevated. The grain passes, by elevator-trunk C or C' and spout, either direct to the scale, as in Fig. 1, or through the pit K, elevator-trunk L, and hopper M, to the scale, from which it passes to the discharging-elevator, F, from which it runs, by spout, to the car awaiting it, or to some other place of delivery.

Having thus fully described my invention, what I claim is—

Arranging on a car elevating-belts and a scale or scales, in such a manner that by the apparatus grain can be taken from a car, weighed, and thrown into another car or warehouse, substantially as shown and described.

J. W. SYKES.

Witnesses:
WM. GARDNER,
J. L. SHORT.